United States Patent [19]
Ota et al.

[11] Patent Number: 5,627,699
[45] Date of Patent: May 6, 1997

[54] MAGNETIC DISK UNIT

[75] Inventors: Shunichiro Ota, Yokohama; Masayuki Kanamaru, Fujisawa; Osaaki Watanuki, Kawasaki, all of Japan

[73] Assignee: International Business Machines Corporation, Armonk, N.Y.

[21] Appl. No.: 385,008

[22] Filed: Feb. 7, 1995

[30]       Foreign Application Priority Data

Mar. 17, 1994  [JP]   Japan ..................... 6-046697

[51] Int. Cl.⁶ ..................................... G11B 17/32
[52] U.S. Cl. ..................................... 360/97.02
[58] Field of Search ................ 360/97.01, 97.02, 360/97.03, 102, 103

[56]            References Cited
         U.S. PATENT DOCUMENTS

| | | | |
|---|---|---|---|
| 4,789,913 | 12/1988 | Gregory et al. | 360/97.02 |
| 5,138,506 | 8/1992 | Beck et al. | 360/97.02 |
| 5,193,046 | 3/1993 | Lemke et al. | 360/97.02 |
| 5,202,803 | 4/1993 | Albrecht et al. | 360/97.02 |
| 5,317,463 | 5/1994 | Lemke et al. | 360/97.02 |
| 5,381,284 | 1/1995 | Gregory et al. | 360/97.02 |
| 5,396,383 | 3/1995 | Gregory et al. | 360/97.02 |
| 5,488,521 | 1/1996 | Lemke et al. | 360/97.02 |
| 5,543,983 | 8/1996 | Gregory et al. | 360/97.02 |

FOREIGN PATENT DOCUMENTS

| | | | |
|---|---|---|---|
| 54-37705 | 3/1979 | Japan | 360/97.03 |
| 59-218668 | 12/1984 | Japan | 360/97.03 |
| 60-13370 | 1/1985 | Japan | 360/97.02 |
| 2252185 | 10/1990 | Japan | 360/97.02 |

*Primary Examiner*—Stuart S. Levy
*Assistant Examiner*—David L. Ometz
*Attorney, Agent, or Firm*—Thomas R. Berthold

[57]               ABSTRACT

To provide a lubricant supply being capable of supplying adequate lubricant over a long period in a magnetic disk unit comprising a lubricant supply to reduce friction between a magnetic disk and magnetic head. A unit of the invention can supply lubricant uniformly to a magnetic disk, and easily controls supply volume. This comprises a material impregnated with lubricant having sufficient lubricant to supply over a long period, a thin film to supply predetermined lubricant to a disk surface, the film permeable by lubricant from the material impregnated with lubricant, and a clamp assembly to fix the material impregnated with lubricant and the thin film to the disk. The thin film is fixed on the disk and compressed by a compression part formed at the edge of the clamp assembly. The degree of compression controls lubricant supply to the disk.

7 Claims, 4 Drawing Sheets

MAGNETIC DISK UNIT

TECHNICAL FIELD

The present invention relates to a magnetic disk unit and, more specifically, to a magnetic disk unit having a structure to reduce friction between a magnetic disk and magnetic head by supplying lubricant between the magnetic disk and magnetic head, wherein the magnetic disk unit comprises a lubricant supply for supplying an adequate volume of lubricant over a long period.

BACKGROUND OF THE INVENTION

A magnetic disk unit comprises a rotary disk having concentric data tracks storing information, a head reading data from or writing data tracks, and an actuator moving the head to the desired track and connected to a head carrier to keep the head in the center of the track during reading or writing. Therefore, in many disk units, an air-bearing slider has mainly been used as a head carrier. This air-bearing method uses air between a disk and head, and makes the head run on the disk by floating the head a predetermined distance from the disk surface.

However, among recent magnetic disk units requiring higher recording and playback density, new units have appeared that reduce the gap between the magnetic disk and magnetic head and get higher recording density with a reduced recording and reading radius. One example of them is a head contact method in which the head records and plays back almost in contact between the head and disk, allowing the head to read and write with a narrower gap between the disk than in the prior air-bearing method. Using this structure, it is possible to attain higher recording density than with a floating head using the prior air-bearing method.

However, this contact magnetic disk unit poses the possibility of disk or head damage by contact friction between the magnetic disk and head. A structure is proposed to avoid this damage, supplying adequate lubricant to the disk and keeping the lubricant between the disk and head. A ski liquid contact is also proposed, forming sliding legs being comprised of convex parts, and contacting these legs to the lubricant film on the magnetic disk surface to make the head slide on the disk with less friction. However, these methods require various tasks, such as lubricant volume adjustment and replacing lubricant.

One lubricant supply type for a magnetic disk recently proposed is a lubricant circulation type which draws the lubricant supplied to a disk surface from a supply assembly, and supplies it to the disk surface from the supply assembly. However, these withdrawal types require a bigger scale for the whole unit, going against trends in downsizing.

Furthermore, problems arise in positioning and space for a lubricant supply source. In the limited space on the magnetic disk unit, it is required to supply lubricant uniformly and stably to the disk surface over a long period.

An example of a previously proposed lubricant supply is one disposing a nozzle tip for lubricant supply to supply the lubricant from an upper position to the predetermined location on the inner circumference of the disk surface, but this has problems in the aspects of uniform lubricant supply and downsizing.

SUMMARY OF THE INVENTION

The present invention has an object of providing a magnetic disk unit which can adjust lubricant supply and, still more, supply lubricant stably and uniformly to the entire disk surface.

Still more, another object of the invention is to provide a lubricant supply suitable to downsizing without wasting space, and contributing to downsizing of a magnetic disk unit.

DETAILED DESCRIPTION

A magnetic disk unit of the invention can supply lubricant uniformly to a disk surface and easily control the supply volume. The invention comprises a material impregnated with sufficient lubricant to supply the disk surface over a long period, a thin film supplying a predetermined volume of lubricant to the disk surface, the lubricant permeating little by little from the material impregnated with lubricant, and a clamp assembly fixing the material impregnated with lubricant and the thin film with the disk.

In a preferable embodiment of the invention, the material impregnated with lubricant is held in a space prepared in a clamp assembly, and the thin film permeable by the lubricant is fixed on the disk in compression with a pressure component formed at an edge of the clamp assembly. This compressed quantity controls the supply of lubricant to the disk surface.

Still more, for relatively fixing the thin film to the clamp, an embodiment of the invention forms a mating structure between the thin film and clamp, such as a plurality of convex parts on one side and a plurality of concave parts on the other, fixes both with this mating, and hence enabling them to keep their positions in spite of high-speed disk rotation, external shock, or change of environmental temperature.

PREFERRED EMBODIMENT

Figure 1:
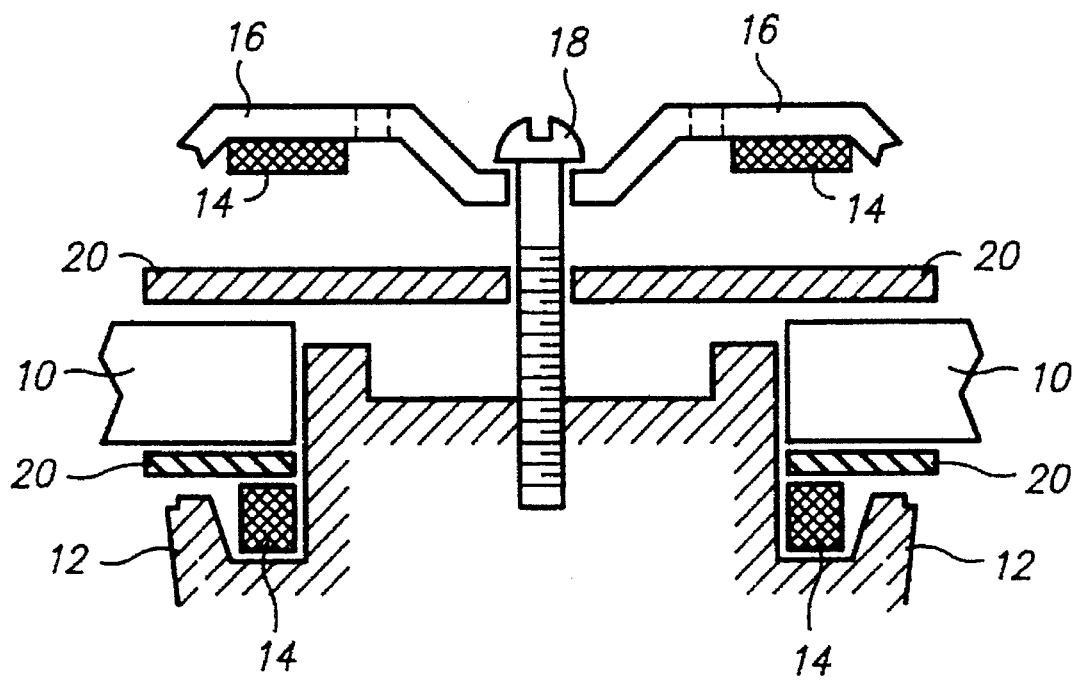
FIG. 1 is a sectional view showing a structure of an embodiment of a lubricant supply composed around a spindle of a magnetic disk unit according to the invention.

A detailed description of the invention is made referring to attached drawings. FIG. 1 is a sectional view showing an embodiment of a lubricant supply disposed around a spindle motor in the center of a disk according to a magnetic disk unit of the invention. A magnetic disk 10 mates its center hole with a spindle motor 12, and the two are held by clamping from both sides of the magnetic disk 10. In this embodiment, the lower clamp is unified with the spindle motor 12.

A clamp ring 16 on the magnetic disk 10 has a concave part to hold a material impregnated with lubricant 14, for example, a sponge and so on. A concave part is also formed on the spindle motor 12 below the disk to hold the material impregnated with lubricant 14. As lubricant, high viscosity lubricant, such as perfluoro-polyether (PFPE) and so on, is used to supply lubricant little by little to the disk surface over a long period. This lubricant is supplied to the upper and lower disk surfaces through thin films 20. The thin films have a predetermined elasticity, and are fixed with a predetermined pressure to the disk surfaces by the clamp assembly. The pressure is controllable by a screw mechanism 18. A film material is, for example, porous plastic or porous sintered metal, which has predetermined elasticity, and through which lubricant is permeable over a long period. Lubricant supply is controlled through adjustment of the thin film pressure.

Figure 2:
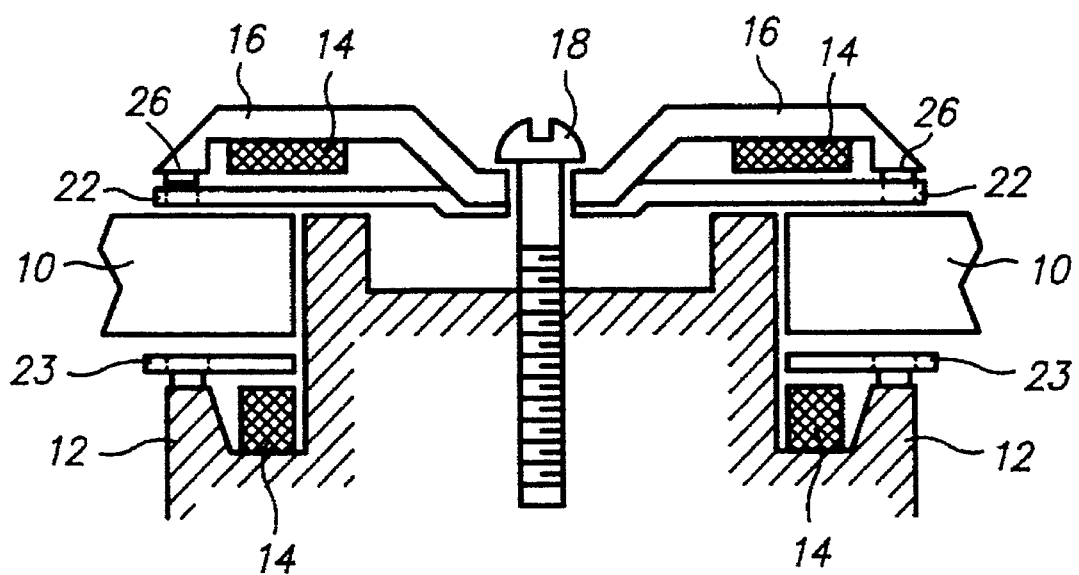
FIG. 2 is a sectional view showing the structure of another embodiment of a lubricant supply composed around a spindle of a magnetic disk unit according to the invention.
Figure 3:
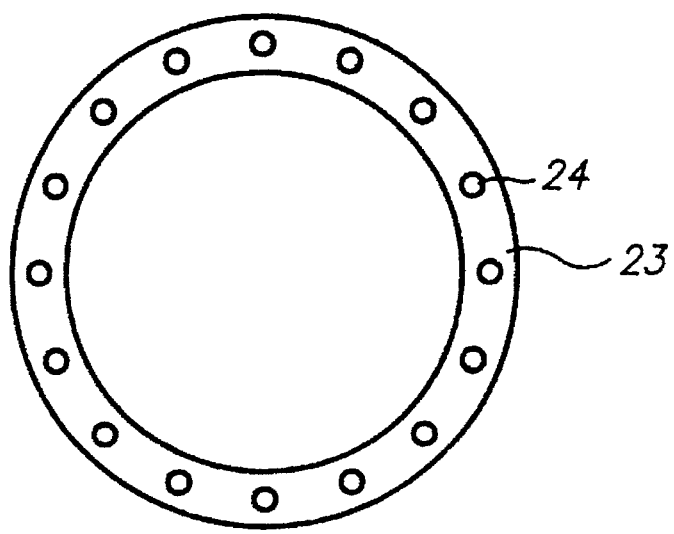
FIG. 3 is a top view of a thin film in the structure shown in FIG. 2.

FIG. 2 shows the second embodiment of the invention. The same components are indicated by the same numbers. This has each material impregnated with lubricant 14 on both sides of the disk 10, and the upper thin film 22 and the lower thin film 23 are fixed between the magnetic disk 10 and the material impregnated with lubricant 14 by the clamp assembly. The thin film of the second embodiment has the structure shown in FIG. 3, which shows a top view of the lower thin film 23 of the disk in FIG. 2. As shown in FIG. 3, a plurality of through-holes 24 is formed in the thin film 23. These through-holes 24 are also formed in the upper thin film 22. The plurality of these through-holes 24 is mated with the convex part 26 formed at the clamp ring 16 on the upper side, and the plurality of convex parts 26 of the clamp assembly unified with the spindle motor. Hence, the plurality of convex parts 26 mating with through-holes 24 formed in the thin film 22 and 23 is unified with the clamp ring 16 and the spindle motor on the lower side of the magnetic disk 10.

The height of this convex part 26 formed in the clamp ring 16 and the spindle motor 12 is lower than the thicknesses of the thin films 22 and 23, and flat parts of the thin films 22 and 23, excluding through-holes 24, are fixed with pressure between a flat part of the clamp except the convex part and the disk. Hence, with the clamp assembly fastened to the disk surface with a screw mechanism, the thin film pressure becomes controllable by adjusting the degree of fastening, also enabling the lubricant supply controllable.

Figure 4:
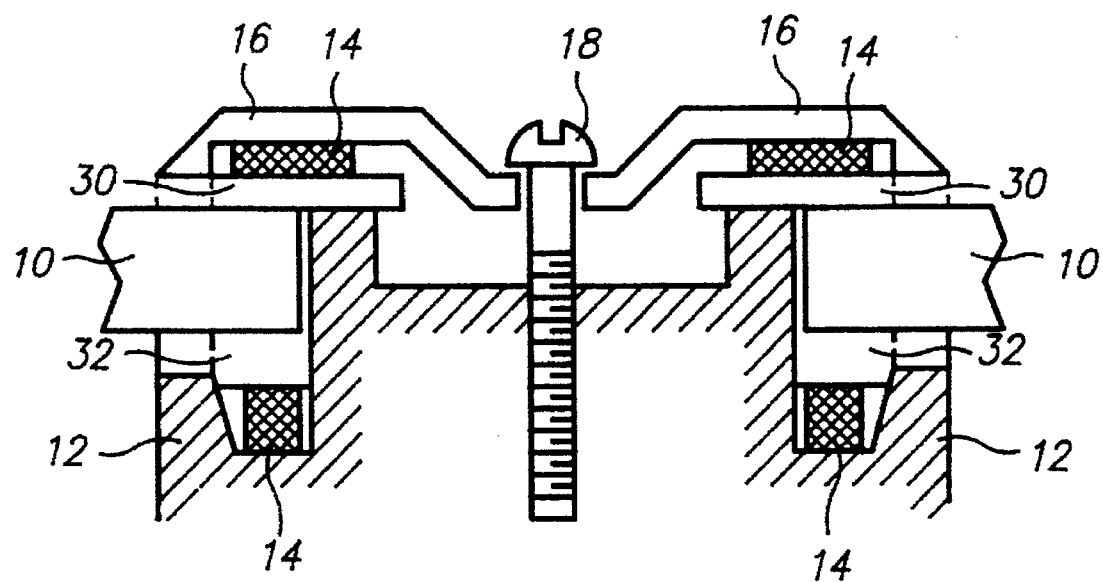
FIG. 4 is a sectional view showing the further embodiment of a lubricant supply composed around a spindle of a magnetic disk unit according to the invention.
Figure 5:
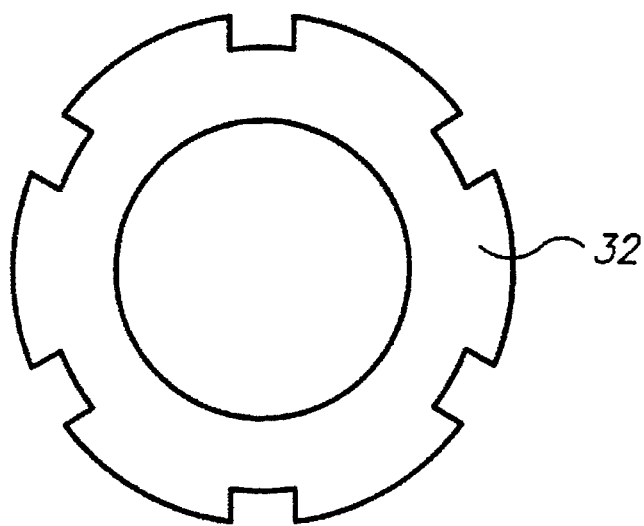
FIG. 5 is a top view of a thin film in the structure shown in FIG. 4.

FIG. 4 is a sectional view of another embodiment of the invention. The thin films 30 and 32 in FIG. 4 have a plurality of notches on the outer circumference. FIG. 5 shows a top view of the thin film 32 on the spindle motor, the lower side of the disk. As shown in FIG. 5, a plurality of notches is formed around the thin film 32. These notches correspond to the through-holes in FIG. 3. Hence, convex parts are formed in accordance with the notches of the thin film 30 at the clamp ring 16 on the upper side of the magnetic disk 10, and convex parts are formed in accordance with the notches of the thin film 32 at the clamp ring 16 on the spindle motor. The height of these convex parts is lower than the thicknesses of the thin films the same as in the embodiment forming the through-holes. Hence, pressure on the thin film is controlled witch the fastening degree of the clamp, and permeability of the lubricant is stabilized.

Figure 6:
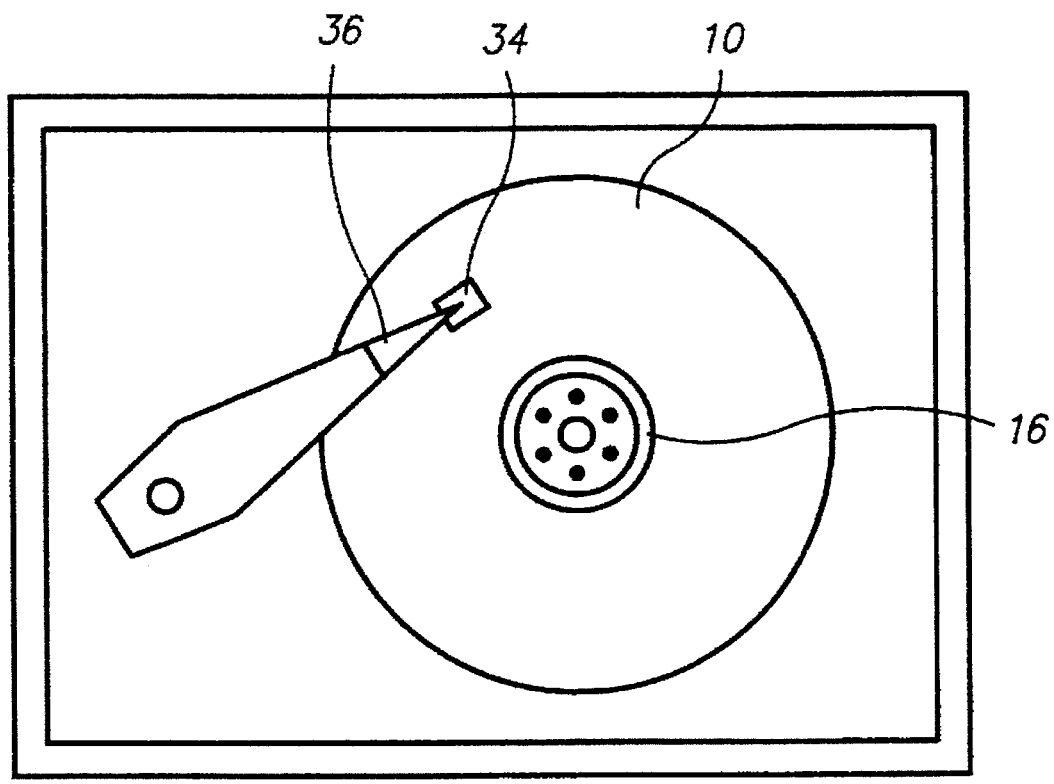
FIG. 6 is a top view of a magnetic disk unit.

FIG. 6 is a top view showing the inside of the magnetic disk unit without a cover, and the magnetic disk 10 is fixed by the ring-shaped clamp ring 16. A thin, continuous film of a comparatively high viscosity lubricant is maintained on the surface of the magnetic disk 10. A magnetic head carrier 34 is installed on a suspension 36 to push a magnetic head carrier 34 to keep contact to the lubricant film on the surface of the magnetic disk 10.

Figure 7:
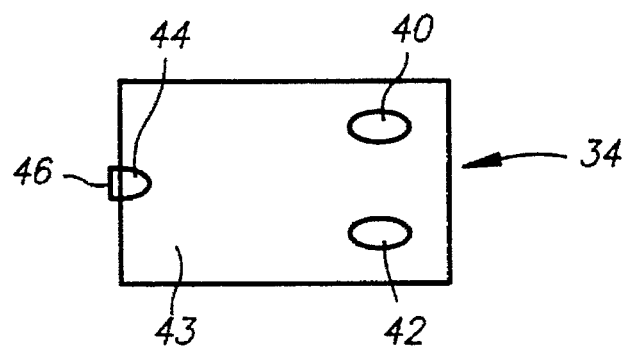
FIG. 7 is a top schematic diagram showing the bottom of a magnetic head and a magnetic head carrier that are used in the invention.

FIG. 7 shows an embodiment of a magnetic head carrier, and a plurality of sliding legs 40, 42, and 44 is formed on a sliding plate 43. The magnetic head carrier can be made of ferrite, or the usual materials for making an air-bearing slider, such as ceramic materials of alumina and titan carbide. The magnetic carrier 34 has a flat face forming each sliding leg. The sliding leg 44 is set nearby the back of the magnetic head carrier. Sliding legs have nearly round edges to enable the magnetic head carrier to slide on the lubricant film without relation to the direction of movement of the magnetic head carrier and are frustums of a circular cone extending from the flat face 43. If the magnetic carrier is on a rotary actuator making the carrier move along a nearly arced route, the carrier can slide, and the direction of movement of the magnetic head carrier against the disk varies based on the radial direction of the carrier.

Figure 8:
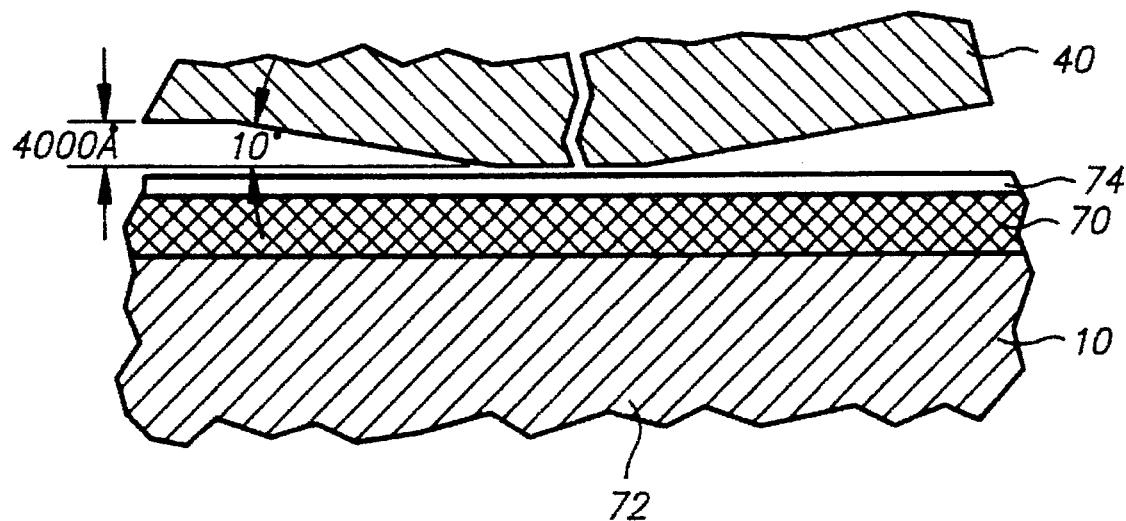
FIG. 8 is a sectional view showing a boundary between a magnetic head carrier and a magnetic disk.

The boundary between the magnetic head carrier and the disk with the lubricant film is shown in FIG. 8. In a preferable embodiment, the magnetic disk 10 has a surface film 70 of conventional amorphous carbon on the top layer, and is usually about 250 Å thick. Under the surface film 70 is a magnetic layer 72 like the usual sputtered magnetic layer of cobalt alloy. Liquid lubricant is set on the surface film 70 in a layer 74 about 10–200 Å thick. FIG. 8 shows a part of the sliding leg 40 on the lubricant film 74. A contacting edge of the sliding leg 40 is about 100 microns in diameter, the cone angle is about 10 degrees, and the etching depth is about 4000 Å. A converter is at the edge of the sliding leg 44 in back of the magnetic head carrier 34 and maintains a gap as wide as the lubricant film is thick (e.g., 20–100 Å) from the upper surface of the disk. In operation, a suspension 36 (FIG. 6) pushes the magnetic head carrier 34 to make the sliding legs 40, 42, and 44 contact the lubricant film 64, and since the lubricant film is incompressible, it functions as a gap adjustment layer between the magnetic head carrier 34 and the magnetic disk 10. A comparatively small angle (10 degrees in FIG. 8) between the contact edge of the sliding leg 40 and the magnetic disk increases slidability of the magnetic head carrier almost without generating barriers against the lubricant passing under the contact edge of the sliding leg 40 in the start of the disk drive.

According to the invention, in a head contact of a magnetic disk unit with lubricant, it is possible to supply the lubricant uniformly to a magnetic disk over a long period, it is easy to control the lubricant supply, it is kept in position through a mating structure, and it provides a lubricant supply structure advantageous in saving space.

While the preferred embodiments of the present invention have been illustrated in detail, it should be apparent that modifications and improvements may be made to the invention without departing from the spirit and scope of the invention as described in the following claims.

What is claimed is:

1. A magnetic disk unit comprising:
   a spindle motor;
   a magnetic disk;
   a clamp assembly to secure the magnetic disk to the spindle motor the clamp assembly having a plurality of convex parts formed on it;
   a material impregnated with lubricant located between the clamp assembly and the magnetic disk;
   a porous film permeable by the lubricant and located between the material impregnated with lubricant and the disk, the porous film having notches formed on its outer circumference in accordance with the convex parts; and
   an assembly to hold and fix the material impregnated with lubricant and the porous film between the clamp assembly and the disk, wherein the porous film is secured on the disk by the clamp assembly through mating of the notches of the porous film with the convex parts of the clamp assembly, and the lubricant in the material impregnated with lubricant is supplied on the disk surface through the porous film.

2. A magnetic disk unit according to claim 1 wherein the holding assembly is a holding structure in the spindle motor of the clamp assembly.

3. A magnetic disk unit according to claim 1 further comprising an adjustment mechanism to adjust pressure to the disk by the clamp assembly to adjust the lubricant supply to the disk surface.

4. A magnetic disk unit according to claim 1 further comprising:
   a magnetic head carrier having sliding legs contacting the lubricant film on the magnetic disk surface, the lubricant film being supplied by lubricant from the impregnated material.

5. A magnetic disk unit according to claim 1 wherein the porous film is made of porous plastic or a porous sintered metal.

6. A magnetic disk unit according to claim 1 wherein the material impregnated with lubricant is made of porous plastic or a porous sintered metal.

7. A magnetic disk unit comprising:

a spindle motor;

a magnetic disk;

a clamp assembly to secure the magnetic disk to the spindle motor, the clamp assembly having a plurality of convex parts formed on it;

a material impregnated with lubricant located between the clamp assembly and the magnetic disk;

a porous film permeable by the lubricant and located between the material impregnated with lubricant and the disk, the porous film having a plurality of through-holes formed on it for mating with the convex parts of the clamp assembly; and an assembly to hold and fix the material impregnated with lubricant and the porous film between the clamp assembly and the disk, wherein the porous film is secured on the disk by the clamp assembly through mating of the through-holes of the porous film with the convex parts of the clamp assembly, and the lubricant in the material impregnated with lubricant is supplied on the disk surface through the porous film.

* * * * *